(12) United States Patent
DePaso et al.

(10) Patent No.: US 7,048,850 B2
(45) Date of Patent: May 23, 2006

(54) WATER SCREEN

(75) Inventors: Joseph M. DePaso, Gretna, LA (US); Omair Zubair, Kenner, LA (US); Kyle J. Sedlacek, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/710,988

(22) Filed: Aug. 16, 2004

(65) Prior Publication Data

US 2006/0032798 A1   Feb. 16, 2006

(51) Int. Cl.
*E02B 5/08* (2006.01)
*B01D 33/04* (2006.01)

(52) U.S. Cl. .............. 210/155; 210/160; 210/400; 405/82

(58) Field of Classification Search ............ 210/155, 210/158, 160, 400, 499; 405/81, 82
See application file for complete search history.

(56) References Cited

U.S. PATENT DOCUMENTS

| | | | |
|---|---|---|---|
| 1,190,920 A * | 7/1916 | Leoni et al. ............ | 210/160 |
| 1,420,283 A | 6/1922 | Randlett | |
| 1,579,105 A | 3/1926 | Green | |
| 2,095,504 A * | 10/1937 | Kesti et al. ............ | 210/160 |
| 2,804,209 A * | 8/1957 | Eastling et al. ......... | 210/160 |
| 3,093,578 A | 6/1963 | Hofmeister ............. | 210/91 |
| 3,802,565 A | 4/1974 | Hughes et al. .......... | 210/160 |
| 3,976,573 A | 8/1976 | Miller .................. | 210/158 |
| 4,064,048 A | 12/1977 | Downs et al. ........... | 210/160 |
| 4,176,984 A | 12/1979 | Sommers ................ | 405/81 |
| 4,186,091 A | 1/1980 | Sutton ................. | 210/77 |
| 4,188,294 A | 2/1980 | Hagihara | |
| 4,210,539 A | 7/1980 | Shiban ................. | 210/391 |
| 4,360,426 A | 11/1982 | Wetzel ................. | 210/160 |
| 4,447,323 A | 5/1984 | Jackson ................ | 210/158 |
| 4,447,324 A | 5/1984 | Jackson ................ | 210/159 |
| 4,488,835 A | 12/1984 | Eicher ................. | 405/83 |
| 4,518,494 A | 5/1985 | Jackson ................ | 210/158 |
| 4,541,930 A | 9/1985 | Heidler et al. ......... | 210/344 |

(Continued)

OTHER PUBLICATIONS

INTRALOX, "Product Line Extension Series 1800 Mesh Top Belt," 2001, Intralox, Inc., Harahan, LA.

(Continued)

*Primary Examiner*—Christopher Upton
(74) *Attorney, Agent, or Firm*—James T. Cronvich

(57) ABSTRACT

A traveling water screen comprising an endless foraminous belt with flights. The foraminous belt forms a water screen extending from a lower end in a flowing stream to an upper end above the surface of the stream. The stream flows through openings in the foraminous screen. The flights, which may be scoops, are arranged in spaced apart relation on the outer surface of the water screen. The water screen is driven in a direction so that its upstream portion advances upward and its downstream portion downward. The flights form inclined surfaces across the width of the screen from a point of highest elevation to one or more points of lowest elevation at one or both side edges of the screen. As the screen moves, the flights lift fish toward the surface. As a flight breaks the surface, fish slide down the inclined flights toward one or both side edges of the screen to be diverted safely. A second water screen having larger openings than the fish-removal water screen can be positioned upstream to filter out large debris and to protect the fish-removal water screen from heavy impacts in a two-stage filter.

55 Claims, 7 Drawing Sheets

U.S. PATENT DOCUMENTS

| | | | |
|---|---|---|---|
| 4,582,601 A | | 4/1986 | Strow et al. ................. 210/161 |
| 4,676,893 A | * | 6/1987 | Travade et al. ............. 210/158 |
| 4,812,231 A | | 3/1989 | Weisemann ................. 210/158 |
| 4,892,652 A | | 1/1990 | Rudy et al. ................. 210/160 |
| 4,929,122 A | | 5/1990 | Yoas ........................... 405/81 |
| 4,935,131 A | | 6/1990 | Pindar ....................... 210/160 |
| 5,059,313 A | * | 10/1991 | Etschel et al. .............. 210/155 |
| 5,242,583 A | | 9/1993 | Thomas ...................... 210/161 |
| 5,300,221 A | * | 4/1994 | Austevoll ................... 210/155 |
| 5,326,460 A | | 7/1994 | Cheesman et al. .......... 210/160 |
| 5,387,336 A | | 2/1995 | Bormet et al. .............. 210/158 |
| 5,393,418 A | | 2/1995 | Jackson ...................... 210/159 |
| 5,415,766 A | | 5/1995 | Quick et al. ................. 210/160 |
| 5,468,376 A | | 11/1995 | Bates ......................... 210/160 |
| 5,489,378 A | | 2/1996 | Cheesman et al. ............ 210/90 |
| 5,501,793 A | | 3/1996 | Cheesman et al. .......... 210/160 |
| 5,565,093 A | * | 10/1996 | Frankenberger ............. 210/160 |
| 5,788,839 A | | 8/1998 | Gargan, Jr. et al. ......... 210/160 |
| 5,800,701 A | * | 9/1998 | Larsen ....................... 210/158 |
| 5,919,358 A | | 7/1999 | Williams .................... 210/160 |
| 6,187,184 B1 | | 2/2001 | Reetz et al. ................ 210/155 |
| 6,294,085 B1 | * | 9/2001 | Bache ........................ 210/155 |
| 6,467,997 B1 | | 10/2002 | Johnson ........................ 405/81 |
| 6,524,028 B1 | | 2/2003 | Bryan ........................ 405/81 |
| 6,698,595 B1 | | 3/2004 | Norell et al. ............... 210/499 |

OTHER PUBLICATIONS

INTRALOX, "Announcing the innovative new fish screen solution that . . . ," Dec. 2003, Intralox, Inc., Harahan, LA.

Nordlund, Bryan and Bates, Ken, "Fish Protection Screen Guidelines for Washington State (Draft)," Apr. 25, 2000, pp. 4-27 and 46-53, Washington Department of Fish and Wildlife.

European Patent Office Search Report, European Patent Application No. 05254754.4, Search Completion Date: Dec. 15, 2005.

* cited by examiner

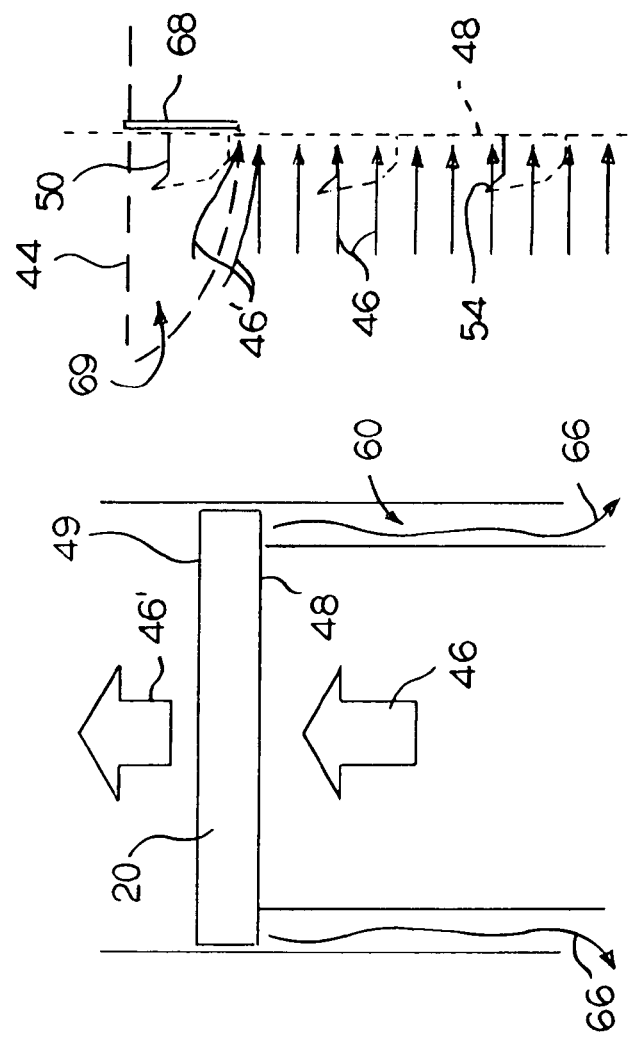
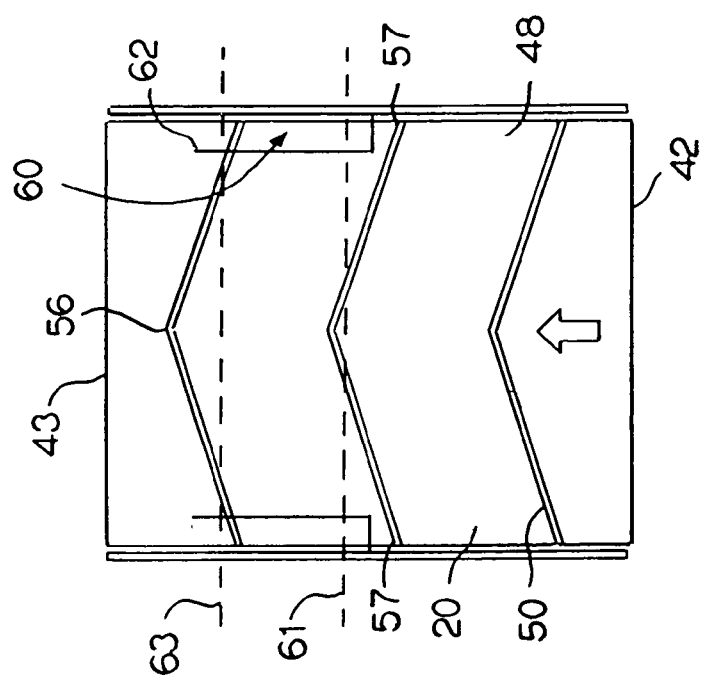

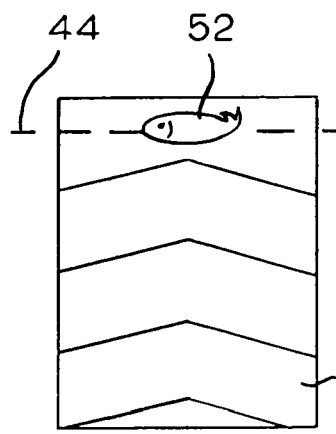
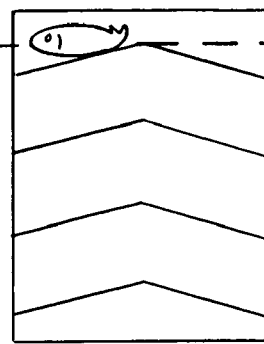
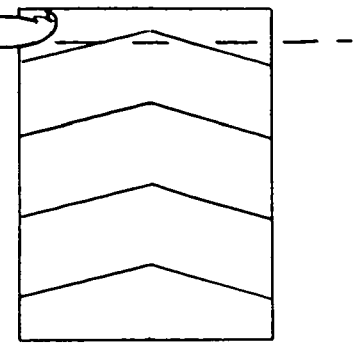
FIG.4A     FIG.4B     FIG.4C
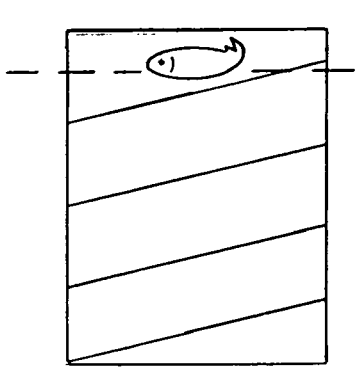
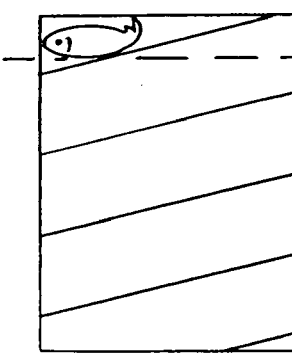
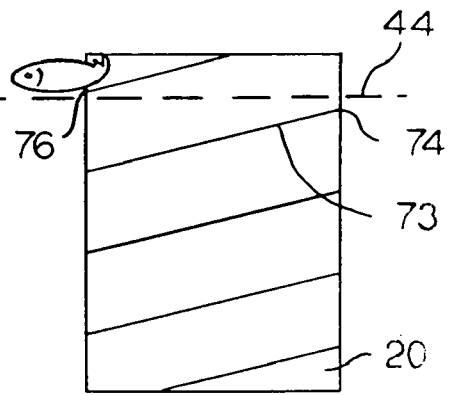
FIG.5A     FIG.5B     FIG.5C
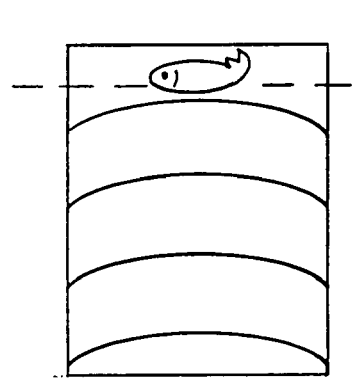
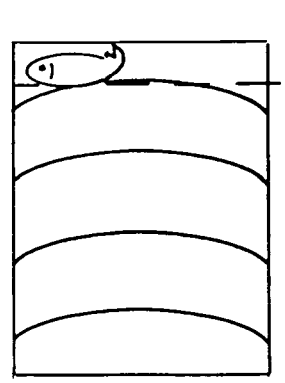
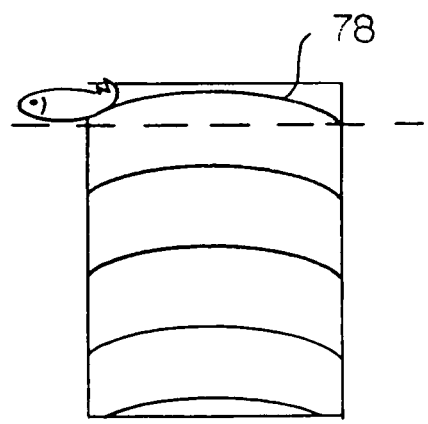
FIG.6A     FIG.6B     FIG.6C

WATER SCREEN

BACKGROUND OF INVENTION

The invention relates generally to traveling water screens for filtering debris and fish from a stream of water and, more particularly, to a traveling water screen made from a modular conveyor belt.

Many industrial processes use water from rivers, lakes, and oceans. Water taken into an industrial plant must be filtered to prevent debris from fouling equipment and causing damage. Water screens filter out and often remove debris from an influent stream before the debris can enter the plant. But the flow of the influent stream can cause fish to impinge on the face of the screen. Fish that are impinged too long eventually die. Consequently, various approaches are used to recover fish impinged on a water screen.

In one approach, a large curved bucket flight is attached to a vertically moving screen. The bucket is designed so that water flows above and below it and through the traveling screen. Fish are trapped in the bucket in a region of reduced water velocity. Trapped fish and debris are lifted vertically out of the water by the moving screen. As the screen goes around the top of its path, fish and debris are washed out with low and high pressure water.

According to yet another approach, a vertical screen with circular elements similar to conveyors commonly seen at baggage claim areas in airports is used. Each circular element is, itself, a moving screen. A scoop is integral to each circular element. The circular elements rise vertically out of the water and over a drive shaft and sprockets. As the circular elements round the drive shaft, the scoops pour fish and debris into a discharge trough.

But each of these approaches can result in high fish mortality rates. First, fish and debris are mixed and may be difficult to separate. Second, in all these approaches, the fish are handled roughly. The fish are pulled out of the water or sprayed under pressure.

Consequently, there is a need for a water screen system that increases fish survivability.

SUMMARY OF INVENTION

This need and other needs are satisfied by a water screen system embodying features of the invention. The system comprises a water screen constructed of a foraminous belt in a loop that extends from a lower end below the surface of a flowing stream to an upper end above the surface of the stream. The belt includes an upward-moving upstream portion and a downward-moving downstream portion. The belt also includes means for lifting fish at the upstream portion of the belt. A dam disposed downstream of the upstream portion of the foraminous belt at the surface of the stream blocks the flow of the stream in a region at the surface.

In another aspect of the invention, a water screen system comprises a traveling water screen comprising a foraminous belt arranged in a loop having an inner side and an outer side. The belt extends in width from a first edge to a second edge. The loop extends from a lower end below the surface of the stream to an upper end above the surface. The belt loop includes an upward-moving upstream portion and a downward-moving downstream portion. Flights on the outer side of the belt extend across its width. On the upward-moving upstream portion of the belt loop, the flights are inclined from a point of highest elevation to a point of lowest elevation at one or the other edge of the belt.

In yet another aspect of the invention, a belt for use as a water screen in a water screen system for lifting fish and debris out of a flowing stream comprises a series of rows of one or more belt modules. Each row extends in a direction of belt travel from a first end to a second end, laterally from a first edge to a second edge, and in thickness from a first side to a second side. Hinge pins hingedly interconnect consecutive rows together end to end into an endless belt. At least some of the modules form openings extending from the first side to the second side to allow a stream of water through the modules. At least some of the modules include flight segments extending from the first side. Modules with flight segments are arranged adjacent to each other to form flights that extend across the width of the belt. Each flight has a leading portion relative to a trailing portion in the direction of belt travel. The trailing portion is disposed at one or both of the edges of the belt.

In still another aspect of the invention, a belt for use as a water screen in a water screen system for lifting fish and debris out of a flowing stream comprises a series of rows of one or more belt modules. Each row extends in a direction of belt travel from a first end to a second end, laterally from a first edge to a second edge, and in thickness from a first side to a second side. Hinge pins hingedly interconnect consecutive rows together end to end into a belt. At least some of the modules form openings extending from the first side to the second side to allow a stream of water through the modules. Flights extend across the width of the belt. Each flight has a leading portion relative to a trailing portion in the direction of belt travel. The trailing portion is disposed at one or both of the edges of the belt.

BRIEF DESCRIPTION OF DRAWINGS

These features and aspects of the invention, as well as its advantages, are better understood by reference to the following description, appended claims, and accompanying drawings, in which:

FIG. 2A is a front elevation schematic view of the water screen system of FIG. 1, FIG. 2B is a top plan schematic view of the water screen system of FIG. 1, and FIG. 2C is a side elevation schematic view of the water screen system of FIG. 1;

FIGS. 4A–4C are front elevation schematic representations of fish removal by the water screen system of FIG. 1;

FIGS. 5A–5C are front elevation schematic representations of fish removal by another version of fish screen usable in a system as in FIG. 1, including fish scoops arranged in an inclined ramp for unilateral fish removal;

FIGS. 6A–6C are front elevation schematic representations of fish removal by another version of fish screen usable in a system as in FIG. 1, including fish scoops arranged in an inverse-U pattern for bilateral fish removal;

DETAILED DESCRIPTION

Figure 1:
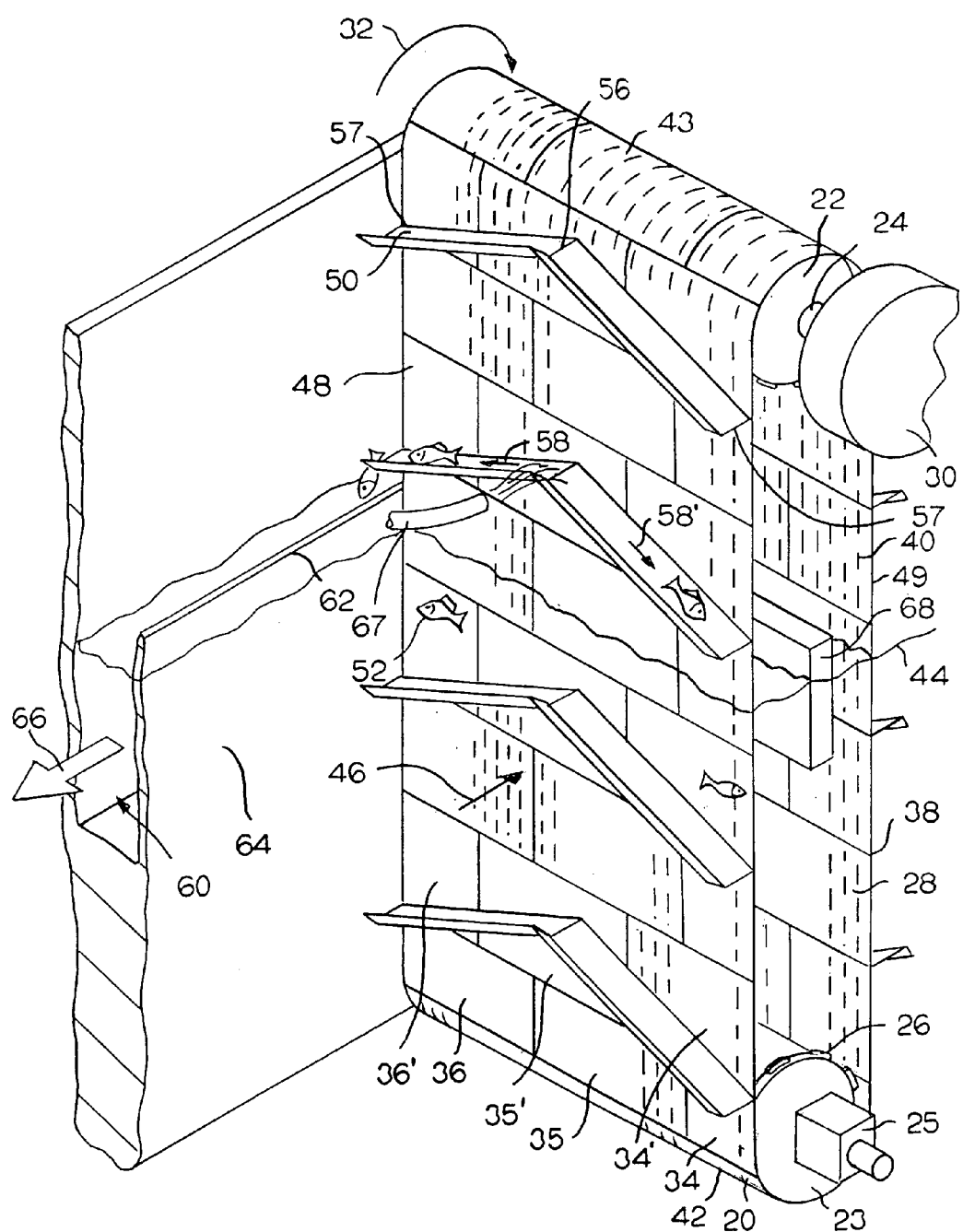
FIG. 1 is an isometric view, partly cut away, of a water screen system embodying features of the invention including fish scoops in a chevron pattern.

One version of a water screen system embodying features of the invention is shown in FIG. 1. The system includes a vertically traveling water screen 20 in the form of an endless modular conveyor belt loop entrained between upper and lower sprocket sets 22, 23 on drive and idle shafts 24, 25. Teeth 26 on the sprockets engage drive structure in the inner side 28 of the belt. A drive motor 30 at the upper end of the belt is coupled to the drive shaft to drive the belt in normal operating conditions in the direction given by arrow 32. Although the belt could be a flat perforated or mesh rubber belt driven between pulleys, it is preferably a modular plastic conveyor belt constructed of a series of rows of belt modules 34, 35, 36, 34', 35', 36'. Consecutive rows are joined together in a hinge joint by a hinge pin 38 received in a lateral passageway through interleaved hinge eyes of consecutive rows. Multiple perforations, or openings 40, make the belt foraminous and suitable for use as a water screen.

The foraminous belt extends in a loop from a lower end 42 below the surface 44 of a stream flowing in the direction indicated by arrow 46 to an upper end 43 above the surface. Driven in the direction of arrow 32, the belt includes an upward-moving upstream portion 48 and a downward-moving downstream portion 49. The perforations allow the stream to flow through both portions of the belt as shown in FIG. 2B with the filtered effluent indicated by arrow 46' slowed slightly. Flights 50 on the belt catch fish 52 impinged on the screen by the flow of the stream through the foraminous belt and lift them out of the water. The flights extend outward from the belt perpendicularly or obliquely from the outer surface of the belt. Thus, the flights provide means of lifting fish at the upstream portion of the belt. Lips 54 formed on the ends of the flights distal from the belt's outer surface help the flights operate as scoops. The lips serve to break the flow of the stream and create a relatively quiescent pool within the scoop in which the fish can swim as they are lifted upward. If the flights extend obliquely from the plane of the belt, the flight structure, even without lips, breaks the flow of the influent stream.

The inverted-V-shaped flights in FIG. 1 also depicted schematically in FIG. 2A, are spaced apart vertically and arranged in a chevron pattern, in which the vertex 56 of each flight defines a point of highest elevation along the upstream portion of the belt, which constitutes a traveling water screen. In the symmetrical arrangement shown, the vertex is at the centerline of the belt. Points of lowest elevation 57 are at opposite side edges of the water screen across the width of the belt. As the upstream portion of the water screen advances upward toward the surface, the point of highest elevation leads the point or points of lowest elevation. The fish collect in the scoops. As the scoop rises above the surface (indicated sequentially from left to right in FIGS. 4A–4C), the collected fish slide down the surface of the scoop toward each side of the water screen as indicated by arrows 58, 58' until they drop into diversions 60 flanking the water screen in the stream (also shown in FIGS. 2A and 2B). The diversion shown in FIGS. 1 and 2A–2B is a discharge trough whose vertical extent ranges preferably from a bottom below the lowest belt level 61 of the stream to a top rim 62 above the highest level 63 of the stream. The version in FIG. 1 with the scoop flights in a chevron pattern accommodates bilateral diversion of fish, in which the right side of the water screen system includes a similar diversion structure (not shown in FIG. 1 for simplicity). The edges of the scoops at the lower-most points 57 form a seal with the walls 64 of the troughs. The seal ensures that fish are lifted out of the influent stream at the upstream face of the water screen. Once the edges of a flight clear the top rims of the troughs, fish, urged by gravity, slide down the sloped face of the flight into the flanking troughs through which the fish may swim to safety as indicated by arrow 66. A flow of water through an outlet 67 may be used to urge fish down the flight.

As an alternative to the sloped flight arrangement, horizontal flights, for instance, can be used to lift fish toward the surface. As shown in FIGS. 1 and 2C, a dam 68 at the surface positioned downstream of the upstream portion of the water screen is used to block the flow 46 of the stream, as indicated by deflected streamlines 46' and FIG. 2C, in a region 69 at the surface. The relatively quiescent pool of water at the surface allows fish impinged against the stream by the current to free themselves. The dam is built to extend above and below the surface of the stream. It may be motor-actuated to move to a selected position spanning the surface or mechanically actuated by means of floats and appropriate linkages to assume a selected level in the stream.

Figure 3:
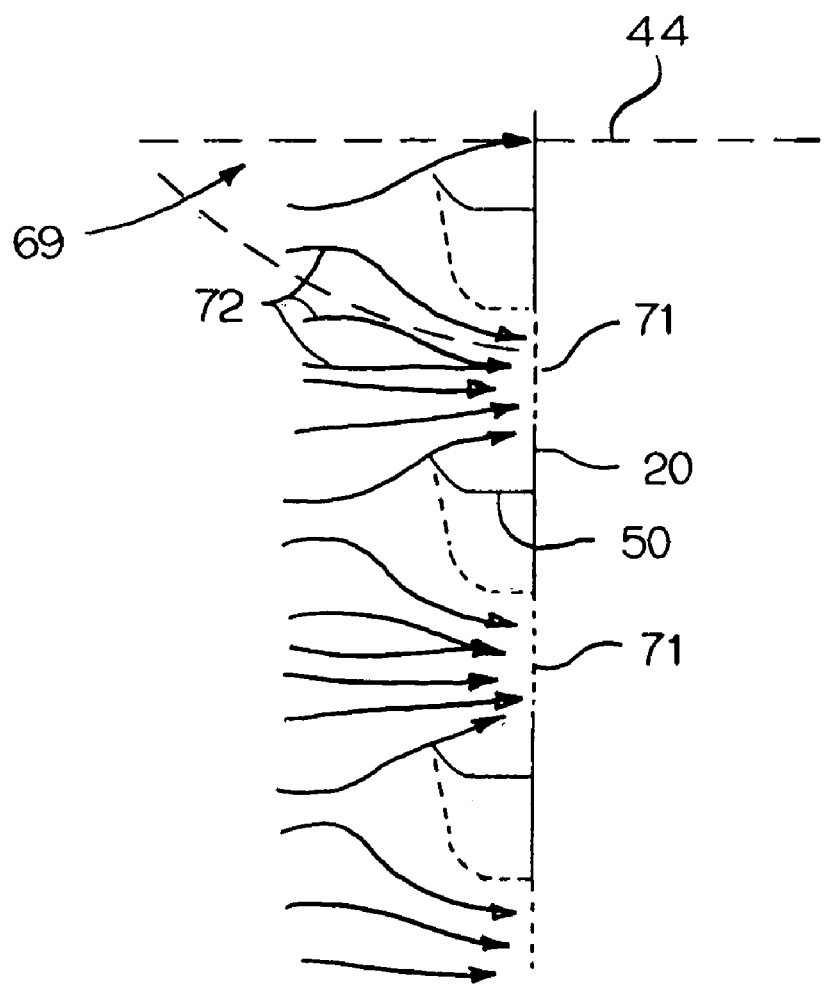
FIG. 3 is a side elevation schematic as in FIG. 2C of another version of water screen system with flow-blocking means in the vicinity of scoops.

A quiescent region at the surface during fish diversion can alternatively be achieved as shown in FIG. 3. In this example, portions of the belt 20 in the vicinity of the flights 50 can be made without perforations. In this way, portions of the belt at the flight act as upward-moving dams. When the flights are at the surface for fish removal, the belt redirects the flow through the foraminous regions 71, as indicated by the diverted streamlines 72. A quiescent region 69 at the surface exists when the belt is in a position for fish to be removed from the surface.

The flights on the water screen may be arranged in patterns other than the chevron pattern of FIGS. 4A–4C. In FIGS. 5A–5C, an inclined-ramp shape 73 has a point of highest elevation 74 at one side edge of the screen and a point of lowest elevation 76 at the opposite side edge. This pattern is effective for the unilateral offloading of fish from the ramp at its point of lowest elevation. Another version of flight pattern is shown in FIGS. 6A–6C. This version offloads bilaterally as the chevron version of FIGS. 4A–4C. But, in this version, inverted-U flights 78 are used instead of inverted-V flights to similar effect. Other shapes that produce a natural pumping action or divert fish as the screen moves upward may be used as well.

Figure 7:
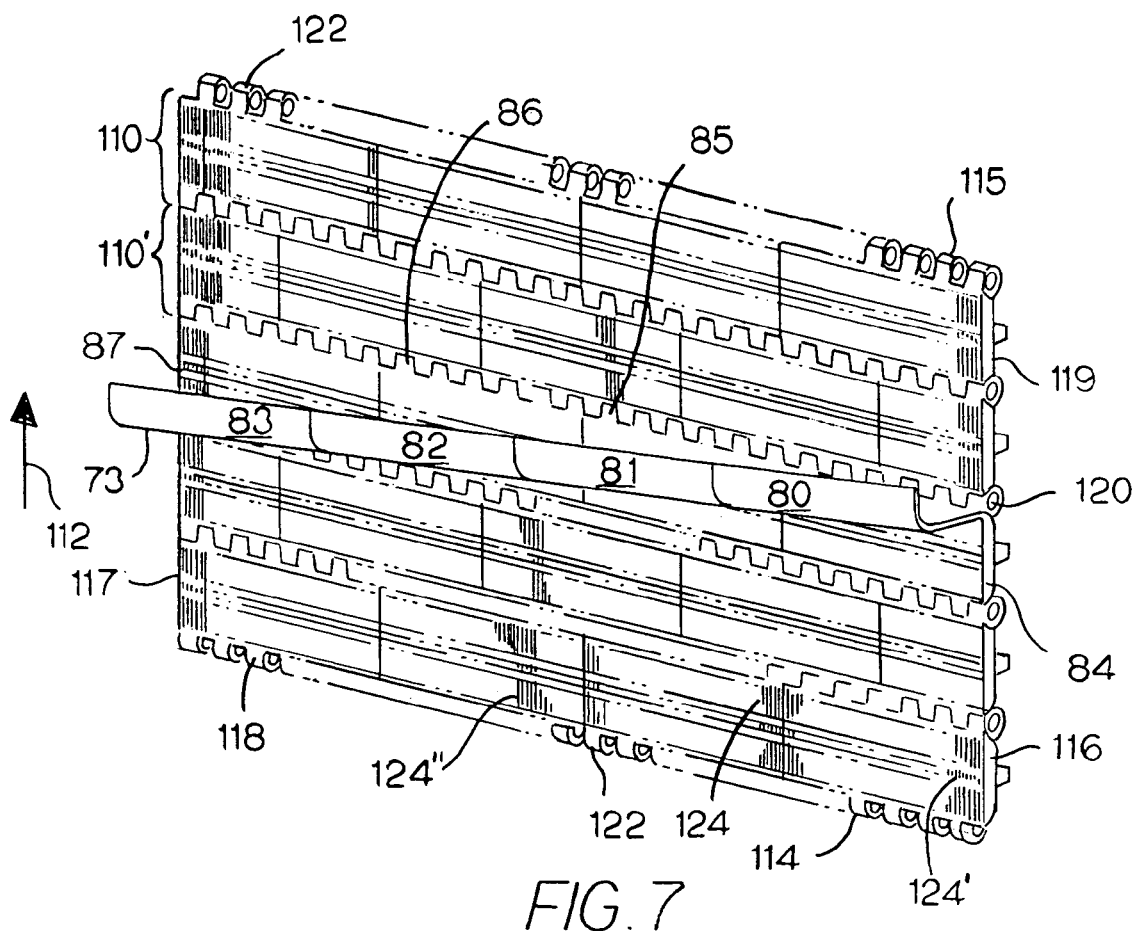
FIG. 7 is an isometric view of the arrangement of scoop segments as in FIGS. 5A–5C on individual modules of a modular plastic belt in a fish screen usable in a system as in FIG. 1.

As mentioned previously, the water screen is preferably realized as a modular plastic conveyor belt, such as a Series 1800 Mesh Top or Perforated Flat Top belt manufactured and sold by Intralox, L.L.C., of Harahan, La., USA. The modular belt, as illustrated in FIG. 7, is constructed of rows 110, 110' of one or more belt modules, which are individually molded, typically in an injection-molding process, out of thermoplastic polymers, such as polypropylene, polyethylene, acetal, and composite materials. Each row extends in a direction of belt travel 112 from a first end 114 to a second end 115, laterally from a first edge 116 to a second edge 117, and in thickness from a first side 118 to a second side 119. The rows are linked serially together into a belt by hinge pins 120 received in the interleaved hinge eyes 122 at the ends of consecutive rows. The modules are preferably arranged in a bricklay pattern for added strength.

Figure 8:
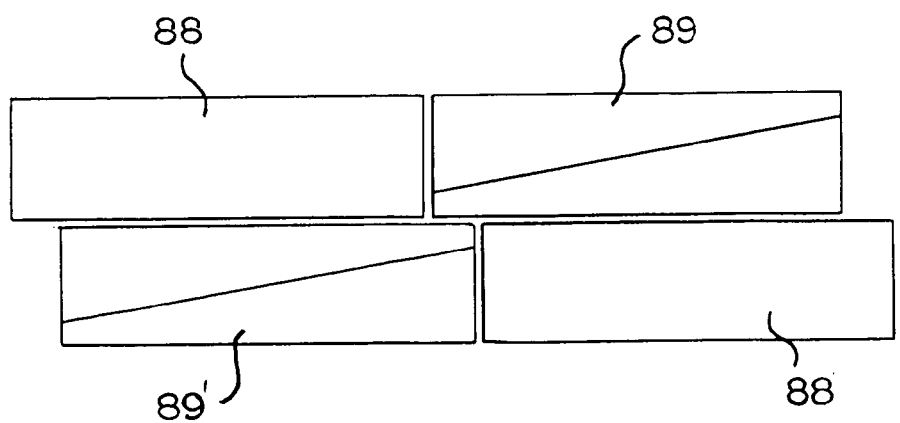
FIG. 8 is a schematic representation of another arrangement of scoop segments on fish screen modules in a shingled pattern for use in a system as in FIG. 1.

In the sloped-ramp version of the water screen represented in FIGS. 5A–5C, each flight 73 extends across the width of the belt, which has openings, in the form of three rows of slits 124, 124', 124" (FIG. 7), extending through the modules to allow water to flow through. If the belt is a modular belt made up of rows of modules, each flight may constitute a series of contiguous flight segments 80, 81, 82, 83, as shown in FIG. 7. Each segment is on an individual module 84, 85, 86, 87 adjacent to one or more neighbors in the belt row. Alternatively, a shingled pattern across two rows can be constructed as shown in FIG. 8. In this version, belt modules without flight segments 88 are combined with belt modules with flight segments 89, 89' to form a portion of a belt. In the bricklay pattern, flight segment 89 overlaps flight segment 89' in a shingle effect that produces a stepped ramp across the width of the belt. Of course, the inverted-V and inverted-U, as well as other, patterns can be constructed in segments as in these examples.

Figure 9A:
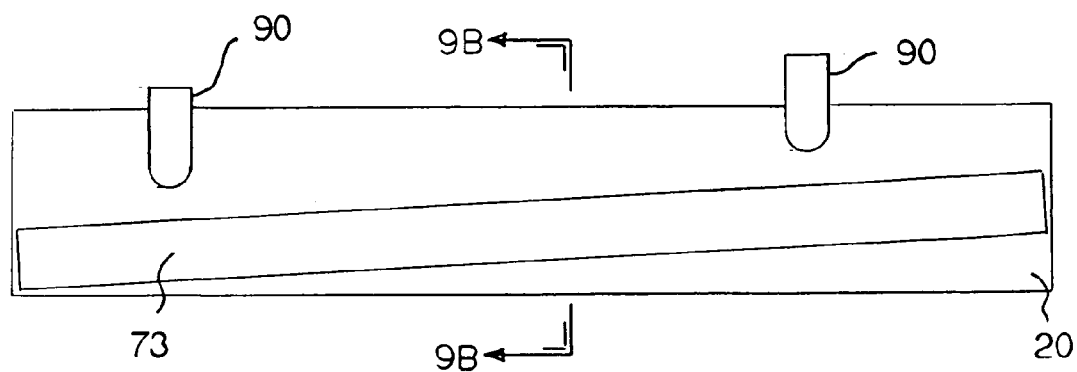
FIG. 9A is a front elevation schematic of a portion of a fish screen as in FIGS. 5A–5C, further including hooks for collecting debris.
Figure 9B:
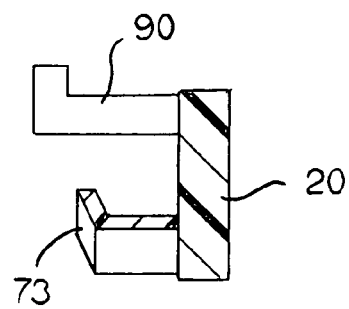
FIG. 9B is a cross sectional view of the fish screen of FIG. 9A.

Besides preserving the lives of fish, water screens have to serve their primary function of preventing debris from interfering with the continuous operation of industrial processes. The water screens 20 described thus far may be outfitted with debris-collecting members, such as pins or hooks 90, for example, as shown in FIGS. 9A–9B, to catch and lift debris upward out of the water for removal from the screen. The hooks, which are relatively narrow, block only a small portion of the flight 73 across the width of the screen. In that way, fish have a better chance of not getting entangled in debris, often floating debris, that is grabbed by the hooks above the flights. The hooks may be molded into or screwed into inserts molded into the belt modules, or otherwise attached into the belt modules.

Figure 10:
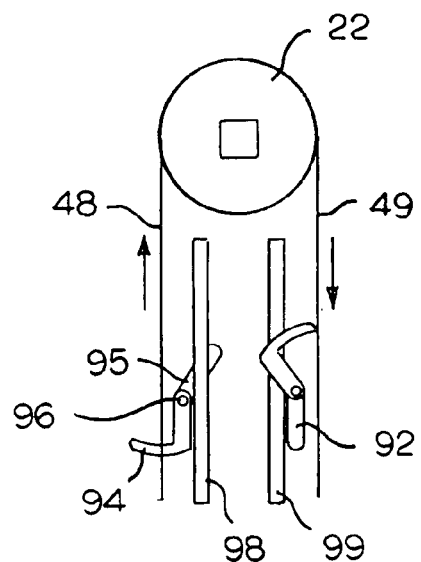
FIG. 10 is a side elevation schematic of a fish screen suitable for a system as in FIG. 1, further featuring retractable hooks to collect debris.

Retractable pins, hooks, shelves, or other protuberances, such as the hooks schematically represented in FIG. 10, hold debris and pull it up out of the influent stream with the belt. Each retractable hook 92, which resides in a recess in the belt, includes two offset cams 94, 95 rigidly linked by a pin 96. On the upward-moving upstream path 48, a first wearstrip 98 acting as a camming surface contacts the hook cam 94, causing its hook end to protrude through the outer surface of the screen. The protruding hook can snag debris and lift it out of the water. On the downward-moving downstream path 49, a second wearstrip 99, laterally offset from the first wearstrip, engages the arm cam 95, which causes the hook cam to retract into its recess in the belt. When the hook is retracted, debris can be removed from the belt more easily. Other mechanisms can be used to actuate and latch retractable hooks or equivalent devices. For example, a counterweight on the hook that extends the hook on the way up and retracts it on the way down can be used.

Figure 11:
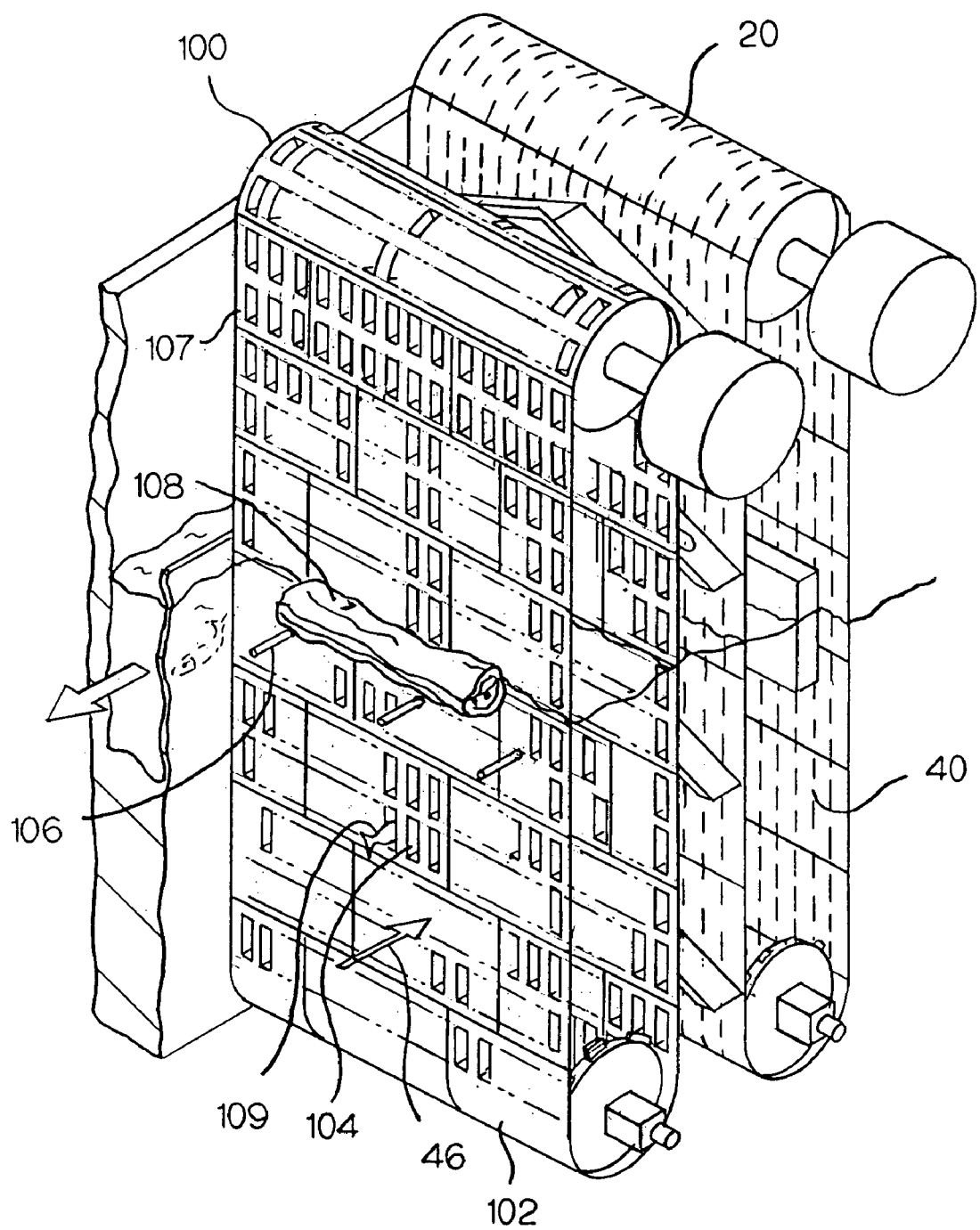
FIG. 11 is an isometric view of a two-stage water screen system having a second water screen upstream of a water screen as in FIG. 1.

A two-stage water screen filter is shown in FIG. 11. In this example, a second water screen 100 is positioned in the stream upstream of the water screen 20 of FIG. 1. The upstream water screen is constructed of a foraminous belt 102, such as a modular plastic conveyor belt or a metal belt, having openings 104 through its thickness that are larger than the openings 40 through the downstream belt. The upstream belt forming the first stage of the water-screen filtering system is used to lift large and heavy debris out of the stream for removal. Debris-collecting members, in the form of pins 106, in this example, extend outward of the upstream water screen to lift debris 108 from the stream as the upstream portion 107 of the screen advances upward. (Pins are shown on only one row of the belt in FIG. 11 to simplify the drawing, but a practical system would have many more pins or other debris-collecting members than are shown.) The openings through the upstream screen are large so as to have little effect on the flow 46 of the stream and to allow small fish 109 that are susceptible to impingement to pass through. The water screen in the second stage of the filter, protected by the first stage from severe and damaging impacts, is primarily involved in removing fish and small pieces of debris from the stream, as described previously in regard to FIG. 1. Because most of the debris is removed in the first stage, debris-collecting members may not have to be used on the downstream water screen.

Although the invention has been described in detail with respect to a few preferred versions, other versions are possible. For example, each flight can be a continuous structure attached across multiple belt modules, rather than a segmented flight. The flights can be made of a different material from the belt, such as a resilient, durable material like urethane. As another example, different shapes or patterns of flights, with or without lips, may be devised for different conditions. As yet another example, the diversion may be positioned at or above water level. Furthermore, the water screen could be angled off vertical. So, as these few examples suggest, the scope of the invention is not meant to be limited to the versions described in detail.

The invention claimed is:

1. A water screen system comprising:
   a water screen comprising a foraminous belt in a loop extending from a lower end below the surface of a flowing stream to an upper end above the surface of the stream, the belt including an upward-moving upstream portion and a downward-moving downstream portion;
   the foraminous belt including means for lifting fish at the upstream portion of the belt upward;
   a dam disposed downstream of the upstream portion of the foraminous belt at the surface of the stream to block the flow of the stream in a region at the surface.

2. A water screen system as in claim 1 wherein the dam extends from above the surface of the stream to below the surface of the stream.

3. A water screen system as in claim 1 wherein the dam floats at the surface of the stream.

4. A water screen system as in claim 1 wherein the means for lifting fish comprises a plurality of spaced apart flights on the belt, each flight extending on the upstream portion from a point of highest elevation to a point of lowest elevation disposed at a side of the belt.

5. A water screen system as in claim 4 wherein the point of highest elevation of a flight is at the opposite side of the belt from the point of lowest elevation.

6. A water screen system as in claim 4 wherein the point of highest elevation of a flight is at the centerline of the belt and wherein points of lowest elevation are at opposite sides of the belt.

7. A water screen system as in claim 4 wherein the flights form a chevron pattern.

8. A water screen system as in claim 4 wherein the belt is a modular belt constructed of individual belt modules, some of which include a flight segment, and wherein each of the flights is formed of vertically overlapped flight segments of adjacent modules across the width of the belt.

9. A water screen system as in claim 4 wherein the belt is a modular belt constructed of individual belt modules, some of which include a flight segment, and wherein each of the flights is formed by flight segments on adjacent side-by-side modules across the width of the belt.

10. A water screen system as in claim 4 wherein each flight extends perpendicularly from the plane of the belt.

11. A water screen system as in claim 4 wherein each flight includes a lip extending upward from the distal end of the flight to form a scoop with the flight.

12. A water screen system as in claim 1 further comprising a diversion at a side of the stream with a side wall terminating above the surface of the stream in a rim over which the means for lifting fish transfers fish lifted from the stream into the diversion.

13. A water screen system as in claim 1 further comprising debris-collecting members extending outward from the belt.

14. A water screen system as in claim 1 further comprising a second water screen disposed in the stream upstream of the other water screen to form a two-stage filter.

15. A water screen system as in claim 14 wherein the second water screen includes a foraminous belt having openings through its thickness larger than openings through the thickness of the foraminous belt in the downstream water screen.

16. A water screen system as in claim 14 further comprising debris-collecting members extending outward from the second water screen.

17. A water screen system comprising:
a traveling water screen comprising a foraminous belt extending in width from a first edge to a second edge and arranged in a loop having an inner side and an outer side and extending from a lower end below the surface of a flowing stream to an upper end above the surface of the stream, the belt loop including an upward-moving upstream portion and a downward-moving downstream portion;
the foraminous belt including flights on the outer side extending across the width of the belt;
wherein the flights on the upward-moving upstream portion of the belt loop are inclined from a point of highest elevation to a point of lowest elevation disposed at one edge of the belt.

18. A water screen system as in claim 17 wherein the flights on the upward-moving portion extend from a point of highest elevation at the first edge to a point of lowest elevation at the second edge.

19. A water screen system as in claim 17 wherein the flights on the upward-moving portion extend from a point of highest elevation midway between the first and second edges to points of lowest elevation at the first and second edges.

20. A water screen system as in claim 17 wherein the flights form a chevron pattern.

21. A water screen system as in claim 17 wherein the flights on the upward-moving portion have an inverted-U or inverted-V shape.

22. A water screen system as in claim 17 wherein the flights extend perpendicularly from the outer side of the belt.

23. A water screen system as in claim 17 wherein each flight includes a lip extending upward from the distal end of the flight to form a scoop with the flight.

24. A water screen system as in claim 17 further comprising debris-collecting members extending outward from the outer side of the belt.

25. A water screen system as in claim 17 wherein the foraminous belt is a modular belt including rows of hingedly linked belt modules and wherein each flight extends across the width of an individual belt row.

26. A water screen system as in claim 17 wherein the foraminous belt is a modular belt including rows of hingedly linked belt modules and each flight is formed of flight segments formed on adjacent modules.

27. A water screen system as in claim 17 wherein the foraminous belt is a modular belt including rows of hingedly linked belt modules, some of which include flight segments forming a portion of a flight.

28. A water screen system as in claim 27 wherein the belt modules that include flight segments have a closed outer side to prevent the stream from flowing through those modules.

29. A water screen system as in claim 27 further comprising a dam that moves with the belt.

30. A water screen system as in claim 17 further comprising a trough at a side edge of the belt along the upward-moving, upstream portion for receiving fish from the flights at the point of lowest elevation.

31. A water screen system as in claim 17 further comprising a dam disposed downstream of the upstream portion of the foraminous belt at the surface of the stream to block the flow of the stream in a region at the surface.

32. A water screen system as in claim 17 further comprising a second water screen disposed in the stream upstream of the other water screen to form a two-stage filter.

33. A water screen system as in claim 32 wherein the second water screen includes a foraminous belt having openings through its thickness larger than openings through the thickness of the foraminous belt in the downstream water screen.

34. A water screen system as in claim 32 further comprising debris-collecting members extending outward from the second water screen.

35. A belt for use as a water screen in a water screen system for lifting fish and debris out of a flowing stream, the belt comprising:
a series of rows of one or more belt modules, each row extending in a direction of belt travel from a first end to a second end, laterally from a first edge to a second edge, and in thickness from a first side to a second side;
hinge pins hingedly interconnecting consecutive rows together end to end into an endless belt;
at least some of the modules forming openings extending from the first side to the second side to allow a stream to flow through the modules;
at least some of the modules including flight segments extending from the first side;
wherein modules with flight segments are arranged adjacently to form flights, each flight extending across the width of the belt and having a leading portion relative to a trailing portion in the direction of belt travel;
wherein the trailing portion is disposed at at least one of the first and second edges of the belt.

36. A belt as in claim 35 wherein the flight segments extend obliquely from the first side of the belt.

37. A belt as in claim 35 wherein the flight segments include a lip formed at the distal end of the flight segment to form a scoop with the flight segment.

38. A belt as in claim 35 wherein each module in a selected belt row includes a flight segment that together with the other flight segments on the row forms an individual flight extending across the width of the row.

39. A belt as in claim 35 wherein the leading portion of each flight is at the opposite edge of the belt from the trailing portion.

40. A belt as in claim 35 wherein the leading portion of each flight is disposed midway between the first and second edges of the belt.

41. A belt as in claim 35 wherein the flights form a chevron pattern.

42. A belt as in claim 35 wherein each flight forms a diagonal across a belt row.

43. A belt as in claim 35 wherein each flight forms an inverted-U or an inverted-V shape with the vertex of the U or V in the leading portion.

44. A belt as in claim 35 wherein the modules having flight segments lack openings extending from the first side to the second side.

45. A belt for use as a water screen in a water screen system for lifting fish and debris out of a flowing stream, the belt comprising:
- a series of rows of one or more belt modules, each row extending in a direction of belt travel from a first end to a second end, laterally from a first edge to a second edge, and in thickness from a first side to a second side;
- hinge pins hingedly interconnecting consecutive rows together end to end into a belt;
- at least some of the modules forming openings extending from the first side to the second side to allow a stream to flow through the modules;
- a plurality of flights extending across the width of the belt, each having a leading portion relative to a trailing portion in the direction of belt travel;
- wherein the trailing portion is disposed at at least one of the first and second edges of the belt.

46. A belt as in claim 45 wherein each flight extends obliquely from the first side of the belt.

47. A belt as in claim 45 wherein each flight includes a lip formed at the distal end of the flight to form a scoop with the flight.

48. A belt as in claim 45 wherein the leading portion of each flight is at the opposite edge of the belt from the trailing portion.

49. A belt as in claim 45 wherein the leading portion of each flight is disposed midway between the first and second edges of the belt.

50. A belt as in claim 45 wherein the flights form a chevron pattern.

51. A belt as in claim 45 wherein each flight forms a diagonal across a belt row.

52. A belt as in claim 45 wherein each flight forms an inverted-U or an inverted-V shape with the vertex of the U or V in the leading portion.

53. A belt as in claim 45 wherein each flight is formed of flight segments on adjacent belt modules.

54. A belt as in claim 45 wherein each flight is a continuous flight attached to the belt.

55. A belt as in claim 54 wherein each flight is made of a urethane material.

* * * * *